United States Patent [19]
Tarter et al.

[11] 3,886,965
[45] June 3, 1975

[54] LINKAGE GEOMETRY FOR A SLURRY SYSTEM

[75] Inventors: James H. Tarter, Royal Oak, Mich.; David L. McCain, Ponca City, Okla.

[73] Assignee: Continental Oil Company, Ponca City, Okla.

[22] Filed: Oct. 10, 1973

[21] Appl. No.: 404,946

Related U.S. Application Data

[63] Continuation-in-part of Ser. No. 298,691, Oct. 18, 1972, abandoned.

[52] U.S. Cl............ 137/355.16; 302/14; 191/12 R; 137/344
[51] Int. Cl........................ F16l 25/00; F16l 11/04
[58] Field of Search .................. 302/14, 11, 64, 23; 299/18, 19; 191/12 R, 12.2 A; 137/355.16, 355.17, 344, 355.12; 74/246

[56] References Cited
UNITED STATES PATENTS

| | | | |
|---|---|---|---|
| 2,686,431 | 8/1954 | Simpkin | 74/246 |
| 2,803,498 | 8/1957 | Touton | 137/344 |
| 2,865,515 | 12/1958 | Spangenberg | 74/246 X |
| 2,893,540 | 7/1959 | Freeman | 74/246 X |
| 3,233,850 | 2/1966 | Merker et al. | 137/344 X |
| 3,324,876 | 6/1967 | Morgan | 137/344 |
| 3,362,752 | 1/1968 | Densmore | 137/344 X |
| 3,602,551 | 8/1971 | Velegol | 302/14 |

*Primary Examiner*—Henry T. Klinksiek
*Attorney, Agent, or Firm*—William J. Miller

[57] ABSTRACT

A system comprising a flexible tubular slurry hose supported by a plurality of spaced carts which are adapted to move over the surface of the earth or the floor of a mine is interconnected by a plurality of links which can be long and short lengths which are pivotally connected alternately together to the carts along the center line of the slurry hose. The linkages provide support for the hose and prevent strain on the hose during movement of the slurry system. The linkage is further defined so that its ideal geometry will permit bending of the hose as much as 180° without causing buckling or crimping of the hose.

6 Claims, 9 Drawing Figures

LINKAGE GEOMETRY FOR A SLURRY SYSTEM

RELATED APPLICATION

This application is a continuation-in-part of application Ser. No. 298,691 filed oct. 18, 1972, entitled "Linkage Geometry for a Slurry System" — now abandoned.

BASIC DESCRIPTION OF THE INVENTION

This invention relates to a linkage designed to interconnect a plurality of carts which is supporting a slurry hose system. The slurry hose has a considerably weight which is partially supported by the linkage mechanism as well as providing a means for clamping the hose. The ideal linkage geometry is designed to permit bending of the hose through a 180° arc without causing the hose to buckle or crimp. The linkage also provides for the application of power to the supporting system for movement of the hose without transferring the power required to pull the system to the hose itself.

DISCUSSION OF THE PRIOR ART

The prior art relating to the above system is found in U.S. Pat. No. 3,260,548, entitled "Method and Apparatus for Continuously Mining and Transporting Coal" by E.H. Reichl. In the patent a coal digging machine is connected to a terminal through a pair of flexible pipes. These flexible pipes are nonsupported but have a slightly greater length than they needed to go from the termination of the fixed pipes to the coal digging machine. Thus, some storage is provided by the excessive length of the hose. The invention thus disclosed, however, does not take into consideration the excessive wear which will result from hoses which are made principally of steel reinforced rubber. These hoses may weigh as much as 100 pounds per foot when full, and movement of a hose of this weight over the rough surface of a mine passage floor will result in early failure of the hose. Furthermore, when the mining machine makes a 90° turn, great difficulty is experienced in successfully moving the hose around the turn.

GENERAL DESCRIPTION OF THE INVENTION

The same numbers will be used throughout the specification for the same or similar parts.

Figure 1:
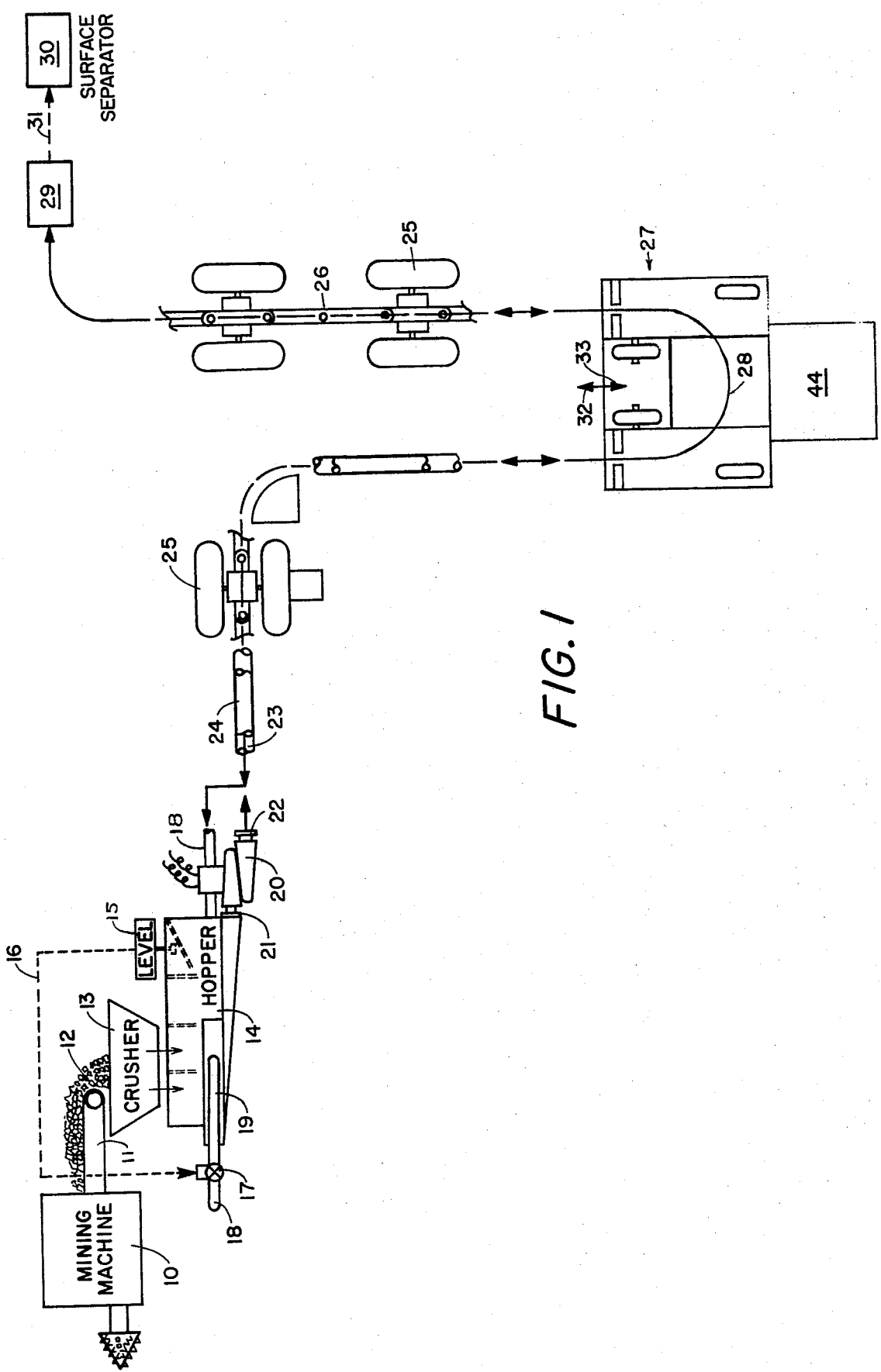
FIG. 1 is a schematic layout of the hose hauling system and its interconnection with the digging machine.

Referring to all of the drawings, but in particular to FIG. 1, a mine digging machine 10 has the product loosened by machine 10 and picked up by a conveyer 11. The product 12 is dropped into a crusher 13, which may be any usual type crusher such as a roll crusher or three-jaw crusher, and may include means for separating the material that does not need to be crushed and crushing only the larger material. Crushers are well known and will not be further discussed. The material from the crusher is dropped into a hopper 14 which contains water. A water level control 15 applies a continuous signal through line 16 to a valve 17 which is connected to a water line 18. Water line 19 is connected to valve 17 and through a plurality of slots (not shown) communicating with the interior of the hopper. The hopper illustrated herein is for the purposes of assisting in the understanding of the invention and is the subject matter of a patent application entitled "Slurry Hopper System," Ser. No. 389,272, filed Aug. 21, 1973, and is copending with this application.

A slurry pump 20 has its inlet connected to the outlet 21 of hopper 14. Slurry pump 20 has an outlet 22 connected to a slurry hose 23. Hose 24 is connected to water line 18. Both hoses 23 and 24 are supported upon a slurry transportation system with essentially comprises a plurality of carts 25 connected by linkage 26. A conveyer 27 controls the movement of the carts, linkage and pipe assembly around 180° turn 28. The termination of the water hose 24 and slurry hose 23 is at a remote terminal 29. A surface separator 30 may be connected to remote terminal 29 through any well known system 31 such as a pipe line.

The operation of the overall system functions as follows:

As the mining machine 10 removes product 12, it is carried up by conveyer 11 and passed to crusher 13 where it is deposited in hopper 14. Pump 20 pulls the slurry mixture from the hopper and passes it into line 23 where it is eventually received at a remote terminal 29, pumped to the surface through pipe line 31, and separated by separator 30. As mining machine 30 works in and out of the coal seam, the slurry hose must follow these movements. Cart 25, through a servo mechanism, will follow the in and out movements of the mining machine. A portion of the slurry line between the conveyer 27 and the remote terminal 29 functions as a storage. Thus as additional length of hose is needed, conveyer 27 will move in the direction of arrow 32, shortening the amount in storage and lengthening the amount of slurry hose which can penetrate the mine room with the mining machine. In order to accomplish the above, however, conveyer 27 must move the carts 25, including the slurry hose supported by it, from the position in storage to a position where it can be utilized by the mining machine. Conveyer 27 accomplishes the transition from storage to active use by lifting the carts upon the conveyer surface and moving the carts through 180° while the conveyer itself is moving in the direction of arrow 33 where additional storage is needed or 32 where less storage is needed. The conveyer further restricts the hose to a definite radius, thereby preventing excess flexing or bending.

LINKAGE GEOMETRY

Referring to FIGS. 2 through 6, a detailed description of the use and development of the linkage geometry is disclosed.

In the preferred embodiment of this invention the hose for either the slurry or the water is approximately one foot in diameter, measured across the outside of the hose. The hose is made of rubber reinforced with steel. The steel prevents collapse of the hose in case a vacuum should be pulled on the system accidentally.

One of the more important restrictions on the operation of the hose hauler vehicle system is that during a turn the one-foot diameter hose must not be bent into a radius small enough to damage the hose. The bending radius is dictated by the structure of the hose and can be modified for any available hose. The approach chosen to insure that this restriction is not violated is to mount the hose 23 or 24 on linkage 26 which will mechanically restrain the hose from elongation. A conveyer or other means is utilized to control the hose during the 90° or 180° turn so that the hose will not be bent into a radius less than the restricted value. The linkage also serves to support the hose between wheel pairs preventing it from dragging on the coal mine floor.

The linkage geometry should be such that the linkage length and the hose length are equal when both are bent into a turn. An example is the 180° turn which is best illustrated by referring to FIG. 2 where a 180° conveyer is shown having a platform 40 and side platforms 41 and 42. Platforms 41 and 42 are attached to platform 40 through a plurality of hinges 43. At the end of platforms 40, 41 and 42 is a plurality of spring-biased (not shown) ramps 44 which are generally in the up position until being pushed to the floor by the application of weight. A center guide rail 45 is formed into a 180° configuration and attached normal to the surface of each of the platforms 40, 41 and 42. A plurality of wheels 46 provides mobility to the ramp. A tractor 47 is connected through a pair of arms 48a and 48b to platform 40.

The slurry system utilizing the conveyer essentially comprises a powered cart 50 and one or more unpowered carts 51. Powered cart 50 includes an electric motor and hydraulic pump assembly 52 connected to hydraulic motors (not shown) which turn wheels 53. Both the powered and the unpowered vehicles contain a hose clamp 54.

The linkage mechanism comprises a long link 55 and a short link 56 alternately interconnected between the powered and unpowered vehicles. Each of the short links contains a hose clamp 54. A guide disc 60 is pivotally journaled through a linkage pivot 61.

Figure 2:
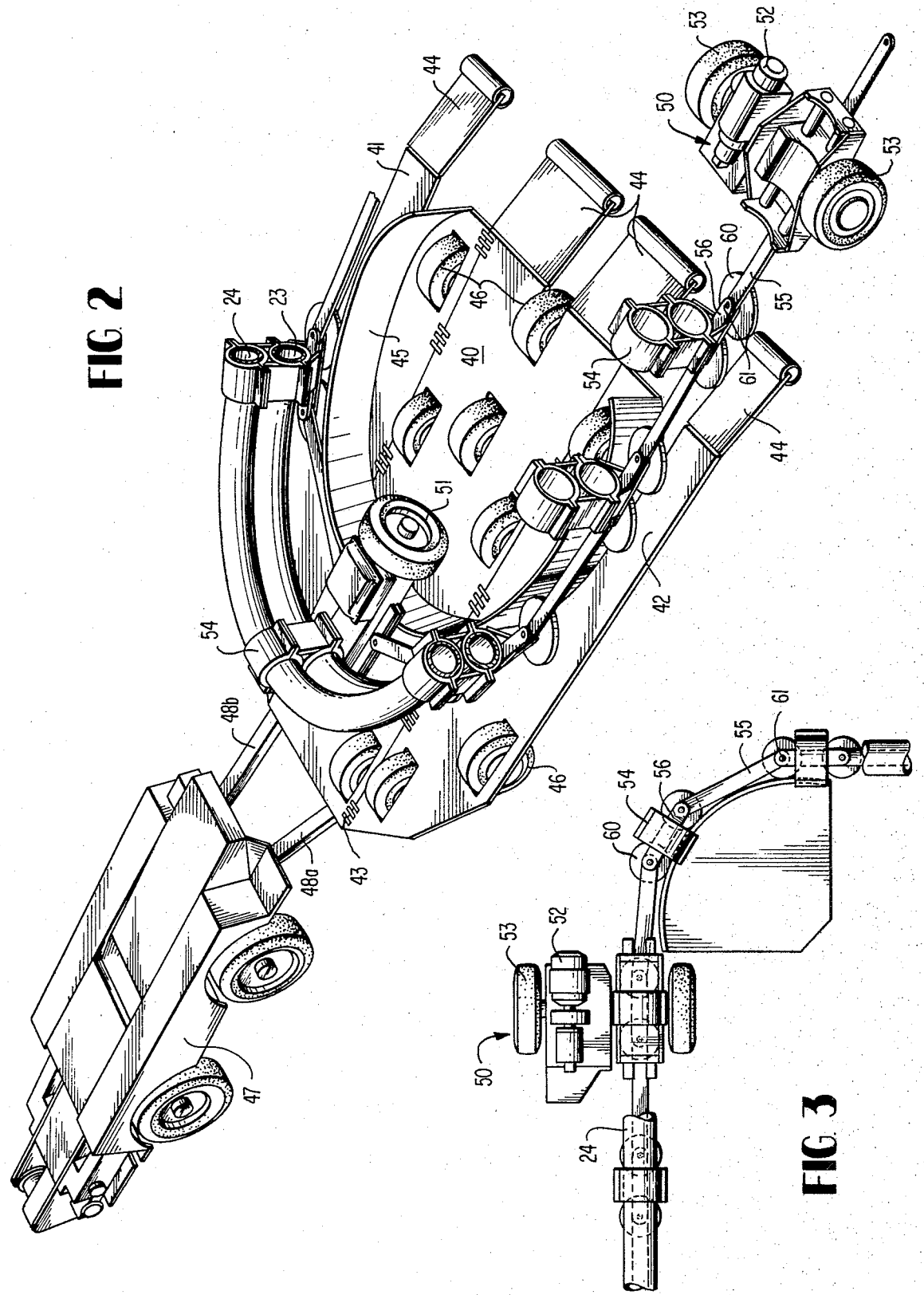
FIG. 2 is a perspective view of a 180° conveyer illustrating the operation of the linkage system.
Figure 3:
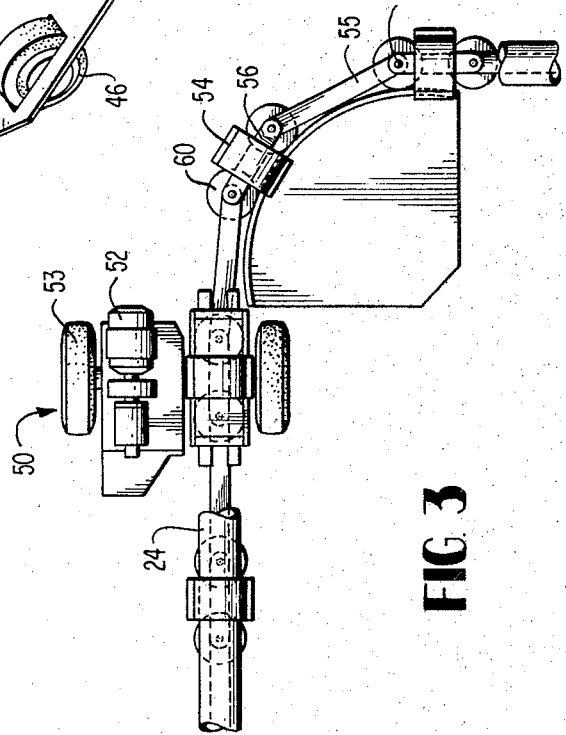
FIG. 3 illustrates a 90° turn for the linkage system shown in FIG. 2.

From viewing FIG. 2 it can be seen that the linkage mechanism comprising long links 55 and short links 56 interconnect cart 50 with cart 51. The short links also provide support for the slurry pipes 23 and 24. Since the slurry hoses are clamped rigidly to the short links or carts, the linkage geometry should restrain the hose during the 180° turn without causing buckling, bending and the like of the hoses. In order to accomplish the above requirements, the linkage geometry should have the same length as the center line of the hose, whether the hose system is in a straight line or bent into a 90° or 180°.

The specific linkage geometry to meet the above requirements is best illustrated in FIGS. 4a through 6b.

SQUARE GEOMETRY

Figure 4A:
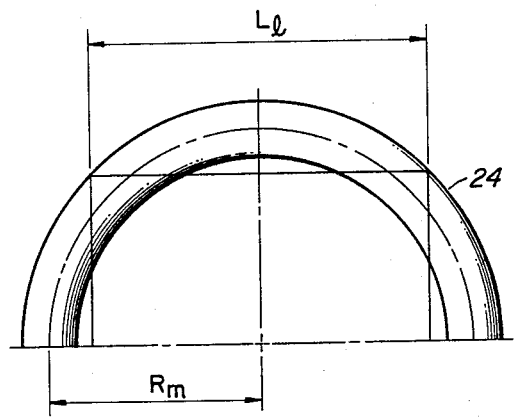
FIG. 4a illustrates the development of ideal linkage geometry based on the square.

FIG. 4a illustrates the development of linkage using as a basis a square geometry. The linkage forms a semi-square when bent around a 180° turn with the hose being supported at the linkage pins such that the center line of the hose is maintained off the center line of the linkage. From the above it can be seen that the distance is occupied by one complete link and two half links or the equivalent of two whole links; therefore, the length of a link $L_1$, for the square case, is given by:

$$L_1 = \pi R_m/2$$

Clamping the hose directly to a linkage pins at an off-center position is functionally inconvenient, and it is much more desirable to clamp the hose to some member which has a finite length and which can support the hose on the linkage center line. The above can be accomplished by cutting off the corners of the basic geometrical figure to form short links which also coincide with the center line of the hose. The length of the long and short links is determined so that the total linkage length is still equal to the length of the hose.

Figure 4B:
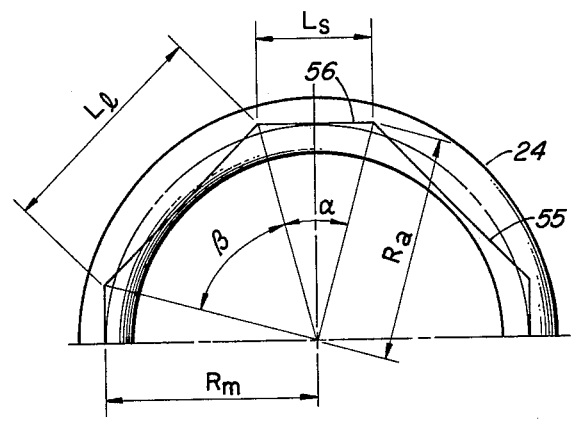
FIG. 4b illustrates the ideal linkage geometry based on a modified square geometry.

Referring to FIG. 4b the modified square is formed by cutting off the corners of the basic square geometry. For the geometry of FIG. 4b the following equations may be written:

$$2 L_1 + 2 L_s = \pi R_m$$
$$\alpha + \beta = \pi/2$$
$$L_s/(2 R_m) = \tan(\alpha/2)$$
$$L_s/(2 R_a) = \sin(\alpha/2)$$
$$L_1/(2 R_a) = \sin(\beta/2)$$

OCTAGONAL GEOMETRY

Figure 5A:
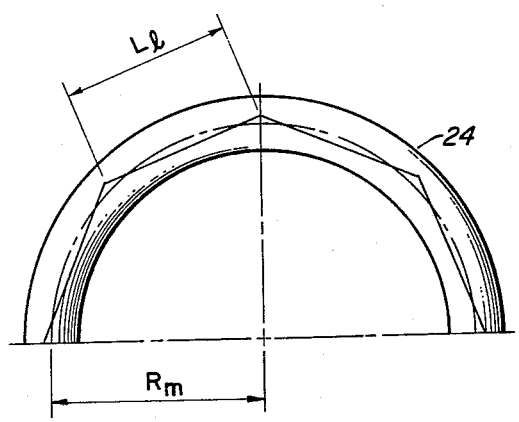
FIG. 5a illustrates ideal linkage geometry based on octagonal geometry.

FIGS. 5a and b illustrate a linkage based on a simple semi-octagonal geometry similar to the semi-square geometry of FIG. 4a. For this case:

$$L_1 = \pi R_m/4$$

For
$R_m = 4.5$ ft.,
$L_1 = 3.54$ feet.

Figure 5B:
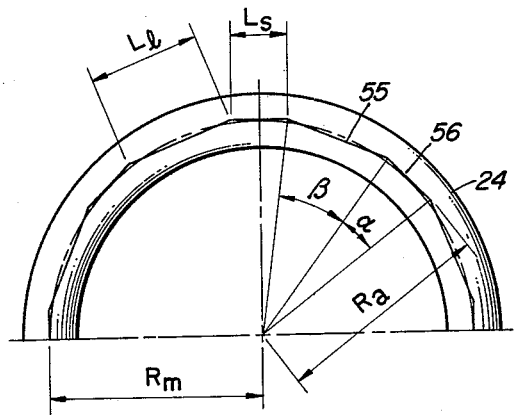
FIG. 5b illustrates ideal linkage geometry developed from the octagonal geometry of FIG. 5a and based on a modified octagonal geometry.

FIG. 5b illustrates the modificatioin of the basic semi-octagon to form alternate long and short links. For this case:

$$4 L_1 + 4 L_s = \pi R_m$$
$$\alpha + \beta = \pi/4$$
$$L_s/(2 R_m) = \tan(=/2)$$
$$L_s/(2 R_a) = \sin(\alpha/2)$$
$$L_1/(2 R_a) = \sin(\beta/2)$$

HEXAGON GEOMETRY

Figure 6A:
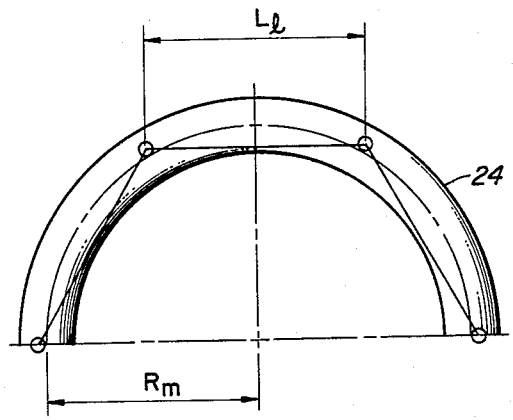
FIG. 6a illustrates the development of ideal linkage geometry based on the hexagon.
Figure 6B:
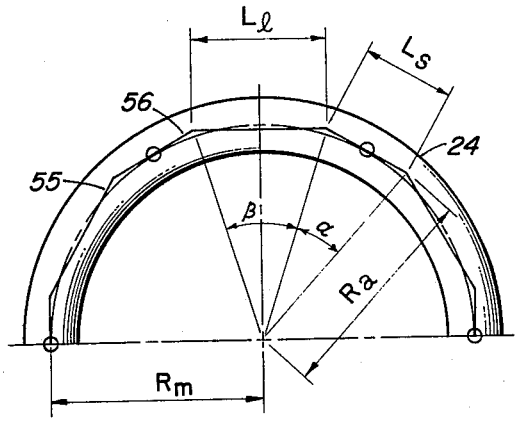
FIG. 6b illustrates the ideal linkage geometry developed from the hexagonal geometry of FIG. 6a and based on dodecagonal geometry.

The preferred embodiment is illustrated in FIGS. 6a and 6b.

Referring to FIG. 6a hexagonal geometry is illustrated having three long links. For the same reasons given previously it is preferred to modify the hexagonal geometry of 6a to form a dodecagonal geometry illustrated in FIG. 6b.

From FIG. 6b the geometry is set up so that a combination of short links ($L_s$) and long links ($L_1$) are calculated so that the longitudinal midpoint of the short links always coincides with the center line of the hose and so that the total linkage length is always equal to the total length of the hose. Further, the hose is always clamped to the shortest links.

Referring to FIG. 6b, the following equations can be written:

$$3L_1 + 3L_s = \pi R_m$$

$$\alpha + \beta = \pi/3$$

$$L_s/(2R_m) = \tan(\alpha/2)$$

$$L_s/(2R_a) = \sin(\alpha/2)$$

$$L_1/(2R_a) = \sin(\beta/2)$$

GENERAL FORMULA 1 $R_m/N$ $m/N$ R

Based on the foregoing cases the general equations can be written for the case in which the hose arc length in a 180° turn or less is supported by N long links. If the linkage is composed of long lengths only and the hose is supported at the joints off the center line of the linkage and the linkage is assuming the form of half of a regular polygon when the hose is bent into a 180° arc, the following equation is true:

$$L_a = \pi r_m/N$$

If the linkage is formed of alternate short and long links where the short links are tangent to a circle of radius $R_m$ when the hose is bent into a 180° arc, then:

$$L_1 + L_s = \pi R_m/N$$

$$\alpha + \beta = \pi/N$$

$$L_s/(2r_m) = \tan(\alpha/2)$$

$$L_s/(2R_a) = \sin(\alpha/2)$$

$$L_1/(2R_a) = \sin(\beta/2)$$

The previous equations may be solved to give:

$$L_1 = \left[ \frac{2\sin\left(\frac{\pi}{2N}\right) - \frac{\pi}{N}\cos\left(\frac{\pi}{2N}\right)}{1 - \cos\left(\frac{\pi}{2N}\right)} \right] R_m$$

$$L_s = \left[ \frac{\frac{\pi}{N} - 2\sin\left(\frac{\pi}{2N}\right)}{1 - \cos\left(\frac{\pi}{2N}\right)} \right] R_m$$

where:
$L_1$ = Link length in basic geometry where linkage assumes the form of a half regular polygon on a 180° turn and long link length in linkage composed of alternate long and short links — ft.
$L_s$ = Short link length — ft.
$N$ = Total number of long links in a 180° arc.
$R_a$ = Distance from center of hose arc to joint between long and short links — ft.
$R_m$ = Mean radius of hose — ft.
$\alpha$ = Angle subtended by a short link — radians.
$\beta$ = Angle subtended by a long link — radians.

EXAMPLE OF SPECIFIC EMBODIMENT

Referring to FIGS. 6a and 6b and the portion of the specification describing the hexagonal geometry, a specific embodiment, by way of example, is set out below:

In the case of a one-foot outside diameter hose being bent into a 180° turn; the critical bending radius is 5 feet, that is, if the radius is less than 5 feet, the hose will be damaged. The inside radius $R_i$ for the above example is then 4 feet and the means radius $R_m$ of the bend is 4.5 feet. A length of hose in a 180° bend is then $\pi R_m$ = 14.14 feet. Solving the equation $L_s$ = 1.585 feet and $L_1$ = 3.127 feet.

Preliminary calculations show that a practical linkage design for a hose length of approximately 1,000 feet can form a span of four long links and three short links between wheel carts occupying short links. The linkage distance between axles of the carts is then 4 (1.585 + 3.127) = 18.85 feet. If each set of powered wheels is to tow two sets of idler wheels, and if the hose line is to be capable of being reversed (implying a powered wheel set at each end of the hose), then the total linkage length is divided into units of 3 × 18.85 = 56.55 feet. If the total line length is not to exceed 1,000 feet, then 17 units of 56.55 feet will be used (with 18 powered wheel sets and 34 idler wheel sets) and the total linkage length will be 17 × 56.55 = 961.4 feet.

In order to prevent the hose flanges from interfering with one another or the clamping points requires that they occur at the midpoints of the long links. Since the midpoints of the long links are spaced at increments equal to 1.585 + 3.127 = 4.712 feet, the hose length must be in increments of this length and no greater than 50 feet. Thus, the hose length is 47.12 feet. If 21 lengths of hose are used each way, the total length of hose would be 989.5 feet, which is 28.12 feet longer than the linkage. It can thus be concluded that 38 lengths of hose 47.12 feet long plus 4 lengths of hose of the length required to make the end connections will be used.

The hose length over all the length of the sections, cart numbers, types, etc., are by way of example only. The above is included to give the length of the hose line and the length of each section of a particular embodiment calculated to illustrate the application of the invention to a particular situation. If the hose can tolerate some additional flexing during the turn, then linkages different than the ideal can be used, for example, the linkages could even be made of equal lengths.

The carts are illustrated as the means to support the hose system; however, skids or other forms of support could also be used and still be within the skill of the art.

In view of the above, an ideal linkage geometry has been described. Several specific examples and a general example have been illustrated. It is obvious that other long and short linkage combinations can be developed which would prove satisfactory. A preferred embodiment has been illustrated and departures from the embodiment are well within the spirit and scope of the invention as defined in the specification and appended claims.

What is claimed is:

1. In a system comprising a longitudinally movable flexible tubular slurry hose means having an axis and a plurality of spaced movable support means, said movable support means being adapted to support said flexible tubular slurry hose means above the surface of the earth and said flexible tubular slurry hose and movable support means being coactive with arcuate turn guides to move therearound while maintaining equal effective length of said flexible tubular slurry hose, and a means for interconnecting said movable support means, said means for interconnecting said movable support means comprising long and short linkage means alternately pivotally connected together between each of said movable support means along the center line of said slurry hose means, means for rigidly securing said slurry hose means to said short linkage means, and means maintaining each pivotal connection uniformly spaced transversely from said arcuate turn guide when said long and short linkage means traverse therearound.

2. A system as defined in claim 1 wherein the combined length of said long and short linkage means equals the length of said slurry hose when said axis is straight and when said axis has a 180° bend.

3. A linkage as defined in claim 2 wherein said slurry hose in clamped to each of said short linkages.

4. A linkage system as described in claim 3 wherein said short linkages are tangent to the axis of said slurry hose when said slurry hose is bent into an arc.

5. In a linkage system for a tubular slurry hose having an axis and a plurality of spaced carts, said carts adapted to move over the surface of the earth, each of said carts securing said slurry hose, a means of interconnecting said carts comprising linkage means including long and short links alternately and pivotally interconnected and wherein said linkage links have a geometry defined by the expression:

$$L_1 = \left[ \frac{2 \sin\left(\frac{\pi}{2N}\right) - \frac{\pi}{N}\cos\left(\frac{\pi}{2N}\right)}{1 - \cos\left(\frac{\pi}{2N}\right)} \right] R_m$$

$$L_s = \left[ \frac{\frac{\pi}{N} - 2\sin\left(\frac{\pi}{2N}\right)}{1 - \cos\left(\frac{\pi}{2N}\right)} \right] R_m$$

where:
$L_1$ = Long link length — ft.
$L_s$ = Short link length — ft.
$N$ = Total number of long links in a 180° arc.
$R_m$ = Mean radius of hose — ft.

6. A linkage system as defined in claim 5 where said linkage geometry is such that the variable N has the value 3.

* * * * *